Figure 1A:
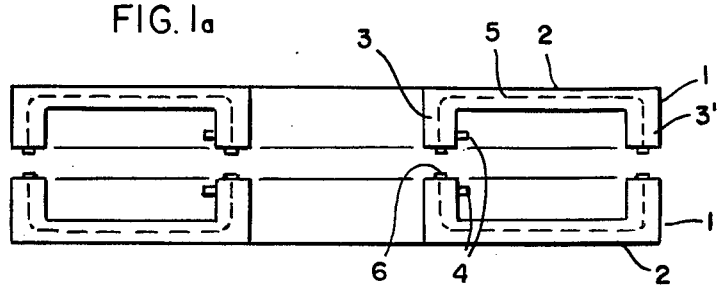

United States Patent [19]

Schaefer et al.

[11] 4,001,463
[45] Jan. 4, 1977

[54] PROCESS AND APPARATUS FOR THE MANUFACTURE OF RIGID MAGNETIC DISCS

[75] Inventors: Dieter Schaefer; Herbert Motz, both of Ludwigshafen, Germany

[73] Assignee: BASF Aktiengesellschaft, Ludwigshafen (Rhine), Germany

[22] Filed: July 21, 1975

[21] Appl. No.: 597,684

[30] Foreign Application Priority Data

July 22, 1974 Germany .......................... 2435096

[52] U.S. Cl. .................................. 427/48; 118/640; 335/284; 427/128; 427/130
[51] Int. Cl.² ....................... B05D 3/14; B05B 5/00
[58] Field of Search .................... 427/48, 130, 128; 118/640; 335/284

[56] References Cited

UNITED STATES PATENTS

| | | | |
|---|---|---|---|
| 3,001,891 | 9/1961 | Stoller | 427/48 |
| 3,588,771 | 6/1971 | Martin | 335/284 |

*Primary Examiner*—Cameron K. Weiffenbach
*Attorney, Agent, or Firm*—Johnston, Keil, Thompson & Shurtleff

[57] ABSTRACT

A process and apparatus for the manufacture of magnetic discs in which the preferred direction of particle orientation is parallel to the plane of the disc and tangential to its circumference. The base discs coated with the still fluid magnetic dispersion, are introduced into a zone of magnetic flux bounded by conductors, the conducting boundary being so arranged that the current flow on one side of the base disc runs radially outwards and on the other side runs radially inwards.

7 Claims, 6 Drawing Figures

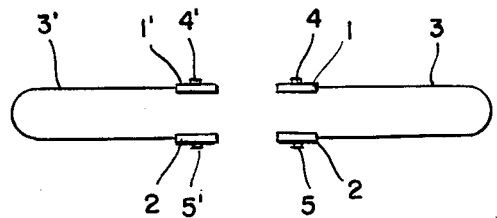
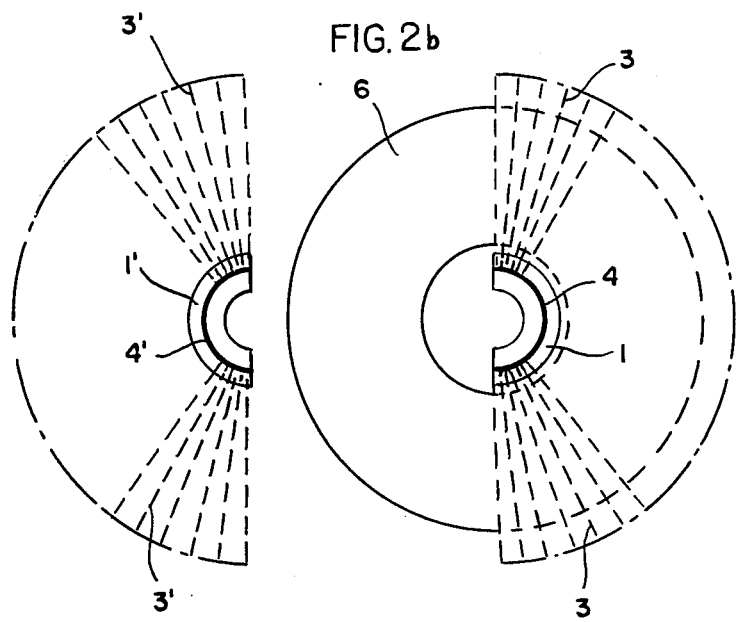
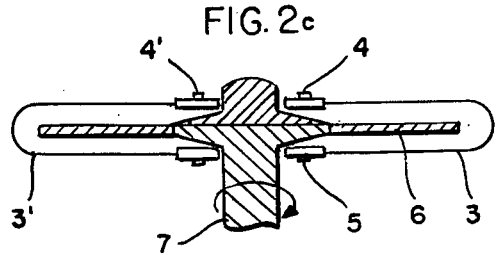

PROCESS AND APPARATUS FOR THE MANUFACTURE OF RIGID MAGNETIC DISCS

The present invention relates to a process and apparatus for the manufacture of magnetic recording media comprising flat rigid discs of a non-magnetic metal and a coating, applied to both sides thereof, which contains magnetic particles dispersed in a binder system, anisotropy being produced within the magnetic coating by the action of a uniform magnetic field.

As is well known, the recording and reproducing properties of magnetic tapes used for recording digital data, audio and video signals can be improved by orienting the magnetizable particles, particularly acicular particles such as chromium dioxide and gamma-iron-(III) oxide particles, in a specific direction. The acicular particles are aligned by means of a uniform magnetic field in the fluid coating with their longest axes, the longest axis being the easy axis of magnetization (uniaxial shape anisotropy), parallel to the surface of the base in the direction of recording. The uniform magnetic field is usually produced by permanent magnets or DC-energized electromagnets, the lines of force of the field being parallel to the direction of recording and to the surface of the base. The direction of recording is for example the longitudinal direction in the case of audio tapes and approximately the transverse direction in the case of video tapes.

It is known to manufacture magnetic discs by coating circular discs of aluminum or aluminum alloy, which are provided with a circular hole in the middle for receiving suitable holding means and drive means, with a liquid dispersion which contains a magnetizable material finely dispersed in a polymeric binder, subsequently drying and/or curing this coating and grinding and polishing it. A coating technique which has proved particularly suitable is the spin coating process, in which the base disc is caused to rotate and the coating mixture allowed to run onto it; this method is described, for example, in U.S. Pat. No. 3,198,657. Other conventional methods of applying the magnetic coating are based on immersing the base disc in the liquid coating mixture, or spraying it with the mixture.

When such magnetic discs are used in recording equipment such as that described, for example, in U.S. Pat. No. 3,176,281, the information is recorded in concentric circular tracks. Hence, the known processes and apparatus for orienting anisotropic magnetic particles, as used for magnetic recording tapes, are not applicable since the magnetic particles must be oriented tangential to the circumference of the discs in order to achieve an increase in the remanent magnetization in the recording direction.

The creation of a toroidal magnetic field by means of a conductor arranged at the center of the circular discs at right angles to the plane of the disc is also not a suitable method of achieving uniform orientation to the magnetic particles in the tangential direction, since the strength of the magnetic field decreases rapidly toward the periphery of the disc and hence the degree of orientation in the inner tracks differs from that in the outer tracks.

German Published Application No. 1,952,627 describes an apparatus for the manufacture of magnetic disc packs, on the disc surfaces of which a magnetically anisotropic copper-cobalt film has been deposited by vacuum evaporation. This apparatus comprises a zone of magnetic flux bounded by three current-carrying sides, the recording medium being introduced into, and removed from, the said zone via the fourth side which does not carry current. The process disclosed in German Published Application No. 1,952,627 however suffers from the disadvantage that the non-current-carrying side, whose diameter is slightly larger than that of the disc, is not used to create a magnetic field, and accordingly, because of the resulting inhomogeneity of the magnetic field, different degrees of orientation prevail at the top and bottom.

An object of the present invention is to provide a process which enables the anisotropic magnetic particles, distributed in the as yet unhardened binder layer applied to the base disc, to be oriented parallel to the plane of the disc and tangential to its circumference, and also enables the two sides of the disc to be uniformly oriented. A further object of the invention is to provide a suitable apparatus for carrying out the process.

We have found that the production of magnetic discs, having the requisite properties, by applying a pourable dispersion, containing finely divided anisotropic magnetic pigments in a solution of a binder in an organic solvent, to rigid circular flat base discs of a non-magnetic material, having a circular aperture in the middle, orienting the magnetically anisotropic particles in the layer of dispersion in the preferred direction parallel to the plane of the base disc, converting the coating into a solid hard magnetic layer by drying and/or curing and subsequently grinding and polishing the magnetic coating, can be advantageously carried out if the base disc coated with the still fluid magnetic dispersion is introduced between conductors, the conductors being so arranged that they run, on both sides of the disc, parallel to the plane of the disc and radially from the central aperture of the disc to the periphery of the disc, and a magnetic field, in the median plane of which the coated base disc is located, is then produced by the flow of current, the current flowing in opposite directions in the conductors located in the two planes, by means of which field the magnetically anisotropic particles are oriented parallel to the plane of the disc and tangential to its circumference, and the coating is dried to lock the particles in their aligned positions.

In an advantageous embodiment of the process of the invention the base disc, coated with the still fluid magnetic dispersion, is introduced into the zone of magnetic flux of a toroidal coil which, to receive the disc, is split into two halves in the median plane at right angles to the axis of rotation of the disc, the circuit being completed by contacts arranged on the surfaces facing each other at the inner and outer peripheries of the coil, so that, after bringing the two halves together, a uniform magnetic D.C. field is produced inside the toroidal coil, by means of which field the magnetically anisotropic particles are oriented parallel to the plane of the disc and tangential to its circumferences, and the coating is dried to lock the particles in their aligned positions.

In a particularly advantageous embodiment of the process of the invention, the base disc, coated with the still fluid magnetic dispersion is introduced into the zone of magnetic flux produced inside a hollow disc which has a central circular aperture, is split in at least one plane parallel to the axis of rotation of the magnetic disc in order to receive the coated disc, and possesses, at the inner peripheries of the segments formed, means for feeding in current on one surface, and means for conducting away current on the opposite surface, whereby the magnetically anisotropic particles are oriented parallel to the plane of the base disc and tangential to its circumferences, and the coating is dried to fix the particles in their aligned positions.

The apparatus according to the invention for the magnetic orientation of anisotropic magnetic particles dispersed in a solution of a curable binder in an organic solvent, the dispersion having been applied to a rigid circular flat disc of a non-magnetic material having a circular hole at the middle, and the preferred direction of particle orientation being parallel to the plane of the disc and tangential to its circumference, comprises conductors which produce a magnetic field and which bound a zone of magnetic flux on all sides, the conductors being arranged in the form of a toroidal coil, which is split into two halves in the median plane in order to recieve the coated disc, which two halves have contacts, to conduct current, on the surfaces facing each other at the inner and outer peripheries of the coil, and means inside the toroidal coil which hold the disc, carrying the coating of magnetic dispersion, in the median plane of the toroidal coil.

In a preferred embodiment of the apparatus of the invention the conductors are arranged along the walls of a hollow disc which is split in at least one plane parallel to the axis of rotation of the magnetic disc in order to receive the coated base disc, and whose upper and lower surfaces are provided in the middle with circular apertures for the admission of means for holding the coated base disc, the inner peripheries of the segments of the hollow disc being provided, on one surface, with means for feeding in current and, on the opposite surface, with means for conducting away current.

In particular, two or more segments of the hollow disc are movably arranged so that they can enclose a base disc mounted on a rotatable shaft and coated with a dispersion of anisotropic magnetic pigments, when they are moved from the outer periphery of the base disc toward the center, their inner parallel surfaces being equidistant from the coated disc, and can release the coated disc again when they are moved in the converse direction.

The processes and apparatus of the present invention have the advantage that all parts of the magnetic disc are uniformly magnetized and that magnetic discs in which the magnetic particles are oriented parallel to the plane of the disc and tangential to its circumferences can be manufactured simply, economically, in large numbers and in constant high quality.

Suitable embodiments of the apparatus according to the invention for carrying out the process of the invention are shown in the drawings and described below in more detail with reference thereto.

Figure 1B:
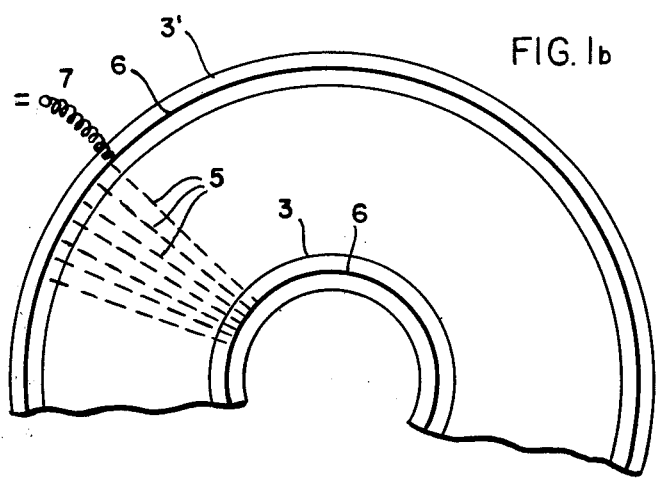
Figure 1C:
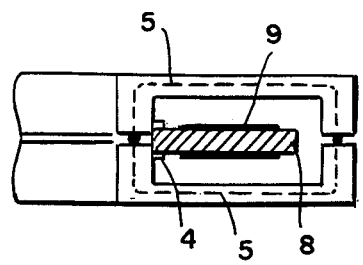

FIGS. 1a to c show, in plan view and in section, a circular apparatus for producing a magnetic field, into which apparatus the coated base disc is inserted.

FIGS. 2a to c show a further embodiment of the apparatus for producing the magnetic field, which enables the coated base disc to be rotated during orientation and drying.

A large number of binders and binder mixtures may be used for the manufacture of magnetic dispersions suitable for use in the production of magnetic disc. Of the binders, which are advantageously used in the form of their solutions or solutions of their components, those with reactive epoxy groups are particularly suitable. Specifically, the polyglycidyl ethers of aliphatic and aromatic polyols, such as glycerol, 1,4-butanediol, bis-(hydroxymethyl)-propane-(2,2) pentaerythritol, bisphenol A (bis-(4-hydroxyphenyl)-propane-(2,2)), bis-(4-hydroxyphenyl)-methane and the like, which may be obtained by reaction of the polyols with epichlorohydrin and are commercially available as surface-coating binders, are very suitable. They may be cured at elevated temperatures by means of, e.g., polyamines, polyamino amides, curable, optionally plasticized phenolic resins of the resol type, curable urea-formaldehyde precondensates or curable melamine-formaldehyde precondensates, of which the methylol groups may also be etherified with lower alcohols. Of course, the coatings may also contain conventional additives, e.g. dispersing agents or lubricants, in the conventional small amounts. Suitable magnetic pigments are those conventionally used, e.g. magnetite, and, preferably, acicular gamma-iron-(III) oxide of average particle size from about 0.1 to 2 $\mu$.

To prepare the dispersion, the mixture of the magnetic pigment, the curable binder and a sufficient amount of solvent is subjected to a conventional dispersing process (e.g. in a ball mill). The application of the dispersion to the base disc may also be carried out by conventinal methods. A very suitable method has proved to be first to apply a coating of the dispersion to the slowly rotating base discs (rotating for example at a speed of from about 100 to 500 revolutions per minute), e.g. by spraying, giving a thickness of, e.g., from 1 to 3 mm, and then to adjust the thickness of the coating to the desired value, e.g. from 2 to 25$\mu$, by rotating the disc at a higher speed, preferably at from about 1,000 to 3,000 revolutions per minute. A coating technique which may be used is described, for example, in U.S. Pat. No. 2,913,246.

The anisotropic magnetic particles contained in the still fluid coating on the base disc are now oriented parallel to the plane of the disc and tangential to its circumference by the process according to the invention.

To achieve this, the coated disc is introduced into an advantageous embodiment of the apparatus of the invention, as shown in FIG. 1. As may be seen in FIG. 1a, to apparatus consists of two halves 1, which can be moved away from, and toward, one another and which are each composed of an insulating plate 2 with an inner and outer insulating spacer ring 3 and 3'. Collars 4 which ensure that the disc is held in the median plane of the magnetic field are provided on the inner ring 3. Radial conductors 5 are arranged on each side of the disc parallel, and in spatial relationship, thereto and are connected together by contacts 6, in the outer and inner rings, to form a flat toroidal coil. The plan view of such an apparatus (cf. FIG. 1b) shows the position of the conductors. The conductors run, on one half of the apparatus, from the inner ring 3 to the outer ring 3', and, on the other half, back again from 3' to 3. The current is supplied at 7. FIG. 1c shows the apparatus according to the invention in operation. The base disc 8 carrying the fluid magnetic coating 9 is held by the collars 4 equidistant from the conductors 5.

To carry out the process according to the invention, the disc which has just been coated is immediately taken from a conventional coating apparatus and introduced into an apparatus according to the invention, e.g. as shown in FIG. 1. After switching on the current, the acicular magnetic particles undergo orientation in the resulting magnetic field. Since the solvents in the magnetic pigment/binder dispersion are volatile, a high proportion of the solvent evaporates, as a result of which the coating solidifies and thereby fixes the acicular particles in their oriented positions. This effect is assisted by the heat generated by the passage of the current. After switching off the current, the magnetic disc may be taken out of the orientation apparatus and the coating subjected to a conventional heat treatment so as to cure the magnetic coating in the manner appropriate for the binder system used. Thereafter the surface of the cured magnetic coating is advantageously ground and polished to give the desired low peak-to-valley height.

In the course of developing the process of the invention for the concentric of the magnetically anisotropic particles in the coating of the magnetic disc, we have found that it is particularly advantageous if the base disc which has just been coated, i.e. which carries a layer of still fluid magnetic dispersion, is immediately exposed to the magnetic field and is kept rotating, during orientation, until the coating has solidified. In particular, inhomogeneities in the coating may thus be prevented because of the flow of the dispersion, which is still fluid.

If these conditions are taken into account, the process according to the invention may also be carried out with a special embodiment of the apparatus, as shown in FIG. 2.

The orienting apparatus according to FIG. 2 consists of two parts, which enables the coated base discs to be introduced into the apparatus. Obviously the apparatus may also consist of more than two parts. Symmetrically to the axis of rotation of the coated disc to be introduced into the apparatus there are, as shown in FIG. 2a, four inner semi-circular conductor rails 1, 1', 2, 2', conductors 3 and 3' running radially from the upper conductor rails 1 and 1', respectively, to the lower conductor rails 2 and 2', so that two hollow disc halves are formed which can, as shown in FIG. 2b, be moved over the coated disc 6. Current is fed in and conducted away at contacts 4 and 4' and 5 and 5' respectively. If the two hollow disc halves are connected in parallel, the electric current for creating the magnetic orienting field is fed in at 4 or 4'. If they are connected in series, the contacts on the conductor rails 1, 1', 2 and 2' of the two hollow disc halves must be insulated from one another. The current can then flow from 4 via the conductor 3 to 5 and from there, to 4' via the conductor 3' to 5'.

FIG. 2c shows a section through an apparatus which is in operation. The disc 6 coated with the fluid magnetic dispersion is held by a conventional clamping device 7 and caused to rotate. The coated disc is totally surrounded by the conductor rails 1, 1', 2 and 2' and the radial conductors 3 and 3'. After magnetic orientation, and solidification of the magnetic coating, the further procedure is as described above.

The concentric orientation of the magnetically anisotropic particles in the coating of the magnetic disc, in accordance with the process of the invention, can be assisted in a conventional manner by a slowly decaying alternating field which is superposed on the orienting D.C. magnetic field. Ultrasonic sound waves may also be employed in an appropriate conventional manner to increase the mobility of the magnetic particles and thus assist their orientation.

The orientation ratio, i.e. the ratio of the residual induction in the recording direction to that in the radial direction, of the magnetic discs manufactured in accordance with the process of the invention may be determined by conventional methods. The advantages of magnetic discs which are magnetically oriented in the recording direction are the same as in the case of conventional magnetic recording media in tape form. In particular, it is possible to reduce the coating thickness and consequently to increase the recording density without there being a decrease in signal strength.

We claim:

1. In a process for the manufacture of magnetic discs by applying a coating of a pourable fluid dispersion containing finely divided anisotropic magnetic particles in a solution of a binder in an organic solvent, to rigid circular flat base discs of a non-magnetic material, having a circular aperture in the middle, orienting the magnetically anisotropic particles in the layer of dispersion in a preferred direction parallel to the plane of the base disc, converting the coating to a solid hard magnetic layer by drying and curing and subsequently grinding and polishing the magnetic coating, the improvement which comprises: introducing the whole base disc coated with the still fluid magnetic dispersion immediately after applying the coating into the median plane of a uniform magnetic D.C. field produced by the flow of current in conductors so arranged that they run, on both sides of the disc, parallel to the plane of the disc and radially from the central aperture of the disc to the periphery of the disc, the current flowing in opposite directions in the conductors located on either side of the disc, thereby orienting the magnetically anisotropic particles parallel to the plane of the disc and tangentially to its circumference, and, with the disc still in the magnetic field, solidifying the coating.

2. The improvement of claim 1, wherein said conductors comprise a toroidal coil which, to receive the disc, is split into two halves in the median plane at right angles to the axis of rotation of the disc.

3. The improvement of claim 1 wherein the conductors comprise a hollow disc which has a central aperture, and is split in at least one plane parallel to the axis of rotation of the coated disc in order to receive the coated disc.

4. The improvement of claim 3 wherein the base disc coated with the still fluid dispersion is mounted on a shaft and surrounded by the hollow disc, comprising two or more segments, in such a way that the base disc lies in the median plane of the hollow disc, and said uniform D.C. magnetic field is produced inside the hollow disc thereby orienting said magnetically anisotropic particles parallel to the plane of the base disc and tangentially to its circumference, and the coated disc is caused to rotate during the orientation of the anisotropic magnetic particles and hardening of the coating.

5. An apparatus for the magnetic orientation of anisotropic magnetic particles dispersed in a solution of a curable binder in an organic solvent, the dispersion being applied to a rigid circular flat disc of a non-magnetic material having a circular hole at the middle, and the preferred direction of particle orientation being parallel to the plane of the disc and tangential to its circumference, the apparatus comprising conductors which produce a magentic field and which bound a zone of magnetic flux on all sides, the conductors being arranged in the form of a toroidal coil which is split into two halves in the median plane in order to receive the coated circular flat disc, which two halves have contacts, to conduct current, on the surfaces facing each other at the inner and outer peripheries of the coil and means inside the toroidal coil which hold the disc, carrying the coating of magnetic dispersion, in the median plane of the toroidal coil.

6. An apparatus for the magnetic orientation of anisotropic magnetic particles dispersed in a solution of a curable binder in an organic solvent, the dispersion being applied to a rigid circular flat disc of a non-magnetic material having a circular hole in the middle, and the preferred direction of particle orientation being parallel to the plane of the disc and tangential to its circumference, the apparatus comprising conductors which produce a magnetic field and which bound a zone of magnetic flux on several sides, the conductors being arranged along the walls of a hollow disc which is split in at least one plane parallel to the axis of rotation of the magnetic disc in order to receive the coated base disc, and whose upper and lower surfaces are provided in the middle with circular apertures for the admission of means for holding the coated base disc, the inner peripheries of the segments of the hollow disc being provided, on one surface, with means for feeding in current and, on the opposite surface, with means for conducting away current.

7. An apparatus as claimed in claim 6, wherein the two or more segments of the hollow disc are movably arranged so that they can enclose a base disc mounted on a rotatable shaft and coated with a dispersion of anisotropic magnetic pigments, when they are moved from the outer periphery of the base disc toward the center, their inner parallel surfaces being equidistant from the coated base disc, and can release the base disc again when they are moved in the converse direction.

* * * * *